United States Patent [19]
Hardison

[11] Patent Number: 5,104,269
[45] Date of Patent: Apr. 14, 1992

[54] SELF-LOCKING ADJUSTABLE CARGO BEAM

[75] Inventor: Charles H. Hardison, Dallas, Tex.

[73] Assignee: JPS Corporation, Dallas, Tex.

[21] Appl. No.: 660,707

[22] Filed: Feb. 25, 1991

[51] Int. Cl.⁵ ............................................. B61D 45/00
[52] U.S. Cl. ................................... 410/149; 410/145; 211/105.3; 211/105.6
[58] Field of Search ....................... 410/121, 143–149, 410/152; 211/105.2, 105.3, 105.6, 123; 248/225.2

[56] References Cited

U.S. PATENT DOCUMENTS

| | | | |
|---|---|---|---|
| 2,608,420 | 8/1952 | Eck | 410/149 |
| 2,806,936 | 9/1957 | Johnston | 410/147 |
| 3,053,549 | 9/1962 | Mutto | 410/149 |
| 3,062,157 | 11/1962 | Woods | 410/149 |
| 3,115,102 | 12/1963 | Rolf, Jr. et al. | 410/145 X |
| 3,227,102 | 1/1966 | Shook | 410/149 |
| 3,411,459 | 11/1968 | Hyatt | 410/147 |
| 3,836,174 | 9/1974 | Holman, Jr. | 410/149 |
| 4,215,784 | 8/1980 | Perkins | 211/123 X |
| 4,256,425 | 3/1981 | Burgess et al. | 410/149 |
| 4,332,515 | 6/1982 | Twyman | 410/145 X |
| 4,494,896 | 1/1985 | DiFranco | 211/105.3 X |

FOREIGN PATENT DOCUMENTS

| | | | |
|---|---|---|---|
| 897499 | 4/1972 | Canada | 410/147 |
| 200607 | 3/1958 | Fed. Rep. of Germany | 410/149 |
| 56539 | 6/1967 | Fed. Rep. of Germany | 410/144 |
| 1153392 | 5/1969 | United Kingdom | 248/225.2 |

*Primary Examiner*—Robert J. Spar
*Assistant Examiner*—Craig Slavin
*Attorney, Agent, or Firm*—W. Kirk McCord

[57] ABSTRACT

A cargo beam is comprised of an elongated center section and opposed end sections telescopically received within the center section. Each end section is adapted for receiving a mounting plug, whereby the beam can be anchored to opposed walls of a load receptacle, such as a truck body. Each end section includes a pair of tubular members connected by a compression spring. The center section has two sets of apertures in each of the opposed side walls thereof. The innermost tubular member of each end section has an aligned pair of holes in the opposed side walls thereof for being aligned with corresponding apertures in the center section, whereby the corresponding end section can be removably attached to the center section by a pair of spring-loaded detents. The length of the beam is adjustable by varying the depth of penetration of one or both of the end sections into the center section. The spring-loaded detents are easily disengaged when it is desired to change the length of the beam.

12 Claims, 3 Drawing Sheets

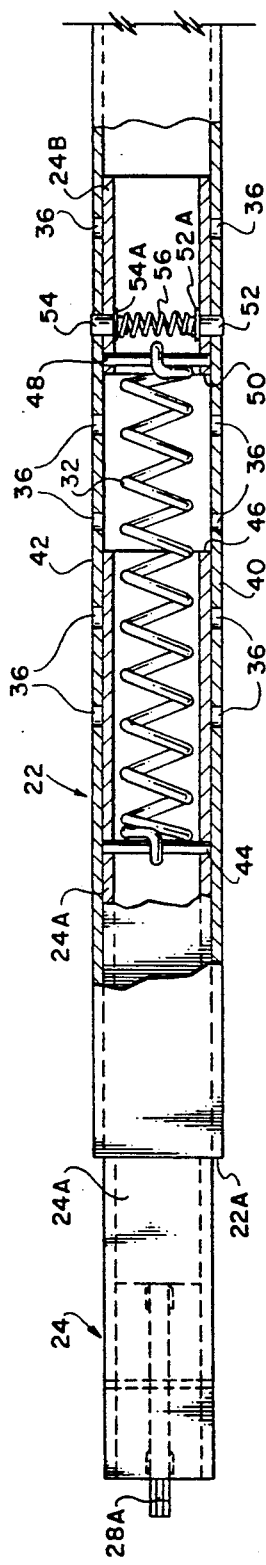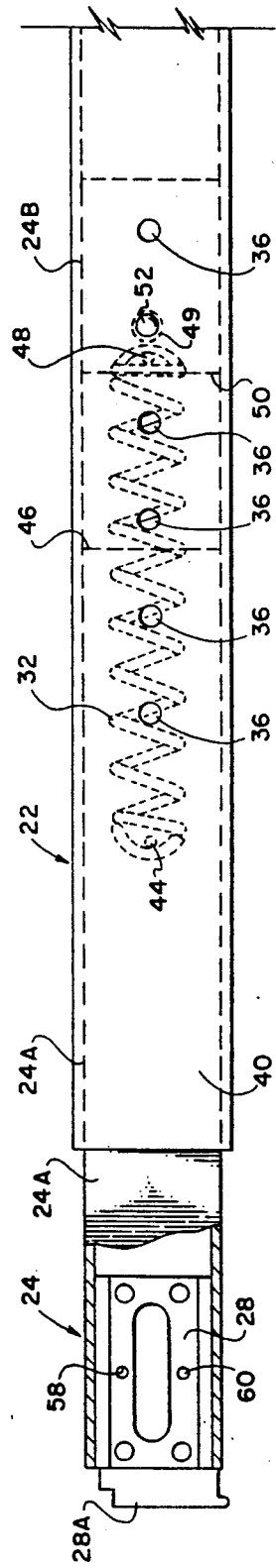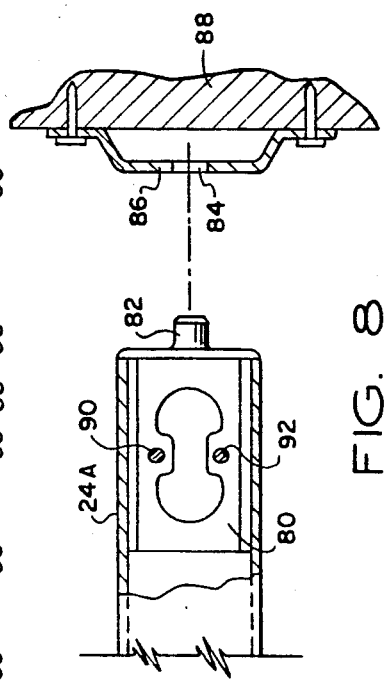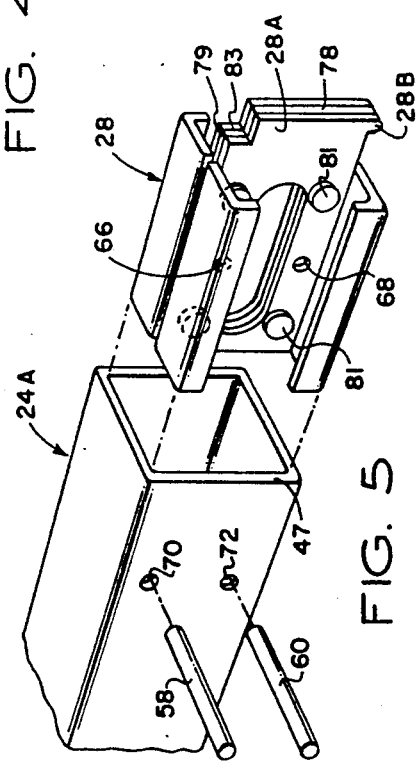

SELF-LOCKING ADJUSTABLE CARGO BEAM

FIELD OF INVENTION

This invention relates generally to cargo beams and in particular to a self-locking, adjustable cargo beam.

BACKGROUND OF THE INVENTION

Support members, such as beams, are often used within a load receptacle, such as a truck body, to partition the load within the truck body, or to form supporting joists for vertically-spaced decking structures extending between opposed walls of the truck body. In operation, the beam is extended between the opposed walls of the truck body and anchored thereto to define a partition or supporting joist, as the case may be.

DESCRIPTION OF THE PRIOR ART

It is known in the art to provide adjustable length cargo beams, as shown in U.S. Pat. No. 3,836,174, which discloses an adjustable length cargo beam having an elongated center section, a first end section telescopically received within the center section and lengthwise adjustable relative to the center section, and a second end section in slidable, telescoping engagement with the center section. The length of the beam is adjustable by adjusting the depth of the penetration of the first end section into the center section and a compression spring is provided for biasing the second end section outwardly from the center section. Because the length of the beam is adjustable at only one end thereof, the beam may not be suitable for use in certain types of load receptacles, depending on the respective widths thereof. A locking mechanism, which includes a spring loaded slide, is carried on the second end section, for holding the second end section in mating engagement with a mounting bracket on the wall of a load receptacle.

OBJECTS OF THE INVENTION

It is therefore the principal object of the present invention to provide an improved cargo beam for utilization within a load receptacle.

Another object of the invention is to provide an improved shoring beam for use within a load receptacle.

Yet another object of the invention is to provide an improved cargo beam which is adaptable for use in a variety of truck bodies having substantially different widths.

Still another object of the invention is to provide a cargo beam with self-locking feature.

A further object of the invention is to provide a cargo beam which is lengthwise adjustable at both ends thereof.

SUMMARY OF INVENTION

These and other objects are accomplished in accordance with the present invention wherein a cargo beam suitable for use in a load receptacle, such as a truck body, as a shoring beam or a divider, includes an elongated center section and opposed end sections telescopically received within the center section, such that the end sections are extendable and retractable relative to the center section to adjust the length of the beam. Each end section has a male mounting member carried therein for matingly engaging a complementary female anchoring member on a wall of a load receptacle, to mount the corresponding end section of the beam on the corresponding wall.

In accordance with one aspect of the invention, the mounting member has a tongue projecting from a bottom part thereof adjacent a leading end of the mounting member. A top part of the mounting member is notched adjacent the leading end, so that an uppermost portion of the mounting member terminates short of the leading end, thereby allowing the tongue to be inserted into the anchoring member in advance of the uppermost portion of the mounting member. After the tongue has been inserted into the mounting member, the corresponding end section is lowered to allow the uppermost portion of the mounting member to be inserted into the anchoring member.

In one embodiment, means is provided for biasing each end section outwardly from the center section to maintain the corresponding mounting member in mating engagement with the corresponding anchoring member. The tongue acts as a catch to prevent the mounting member from being disengaged from the anchoring member as long as the uppermost portion of the mounting member is received within the anchoring member. To disengage the mounting member from the anchoring member, the corresponding end section is retracted toward the center section to remove the uppermost portion of the mounting member from the anchoring member and the corresponding end section is lifted to allow the tongue to be removed from the anchoring member.

In accordance with another aspect of the invention, the cargo beam is adapted for receiving a mounting member having at least one rounded nipple, projecting from a leading end thereof, for engaging a complementary circular opening in an anchoring member attached to the wall of a load receptacle. The so-called "F" track is commonly used in load receptacles, such as truck bodies. The "F" track is an elongated track mounted on the wall of the load receptacle and includes a plurality of circular openings at spaced intervals along the track. In accordance with the present invention, the cargo beam is adapted for carrying a mounting member on each end thereof for matingly engaging the circular openings in the standard "F" track.

In accordance with yet another aspect of the invention, each end section is comprised of first and second hollow members, with a resilient member coupled therebetween, such that the resilient member biases the second hollow member away from the first hollow member. The second hollow member extends outwardly from the center section and has an open end for receiving a corresponding mounting member. The first hollow member is adapted for being attached to the center section, to anchor the corresponding end section with respect to the center section. The position at which the first hollow member is attached to the center section determines the overall length of the beam.

In accordance with still another aspect of the invention, the center section includes a plurality of cooperating pairs of apertures in transverse axial alignment and spaced at predetermined intervals along the center section. The first hollow member of each end section includes first and second holes in transverse axial alignment and first and second detents biased into mating engagement with the respective first and second holes by a resilient member coupled between the first and second detents. The first hollow member is attached to the center section by aligning the first and second holes with a selected one of the corresponding pairs of apertures, whereupon the first a second detents will be biased into mating engagement with respective apertures in alignment with the first and second holes. To disengage the first hollow member from the center section, the first and second detents are compressed out of mating engagement with the respective apertures, thereby allowing the position of the first hollow member to be adjusted longitudinally, to adjust the overall length of the beam accordingly.

BRIEF DESCRIPTION OF THE DRAWINGS

The foregoing and other features, characteristics, advantages, and the invention in general, will better understood from the following, more detailed description, taken in conjunction with the accompanying drawings in which:

FIG. 3 is a top plan, partial cut-away view of an end portion of the cargo beam of FIG. 1;

FIG. 4 is a side elevation view of the end portion of the cargo beam of FIG. 3;

FIG. 5 is a perspective view, showing the engagement between one end of the cargo beam and a mounting plug for anchoring the cargo beam on a wall of the load receptacle;

FIG. 8 is a side elevation view of one end of the cargo beam, with the plug member of FIG. 7 inserted therein, illustrating the attachment of the cargo beam to the wall of the load receptacle.

DETAILED DESCRIPTION OF THE PREFERRED EMBODIMENT

Figure 1:
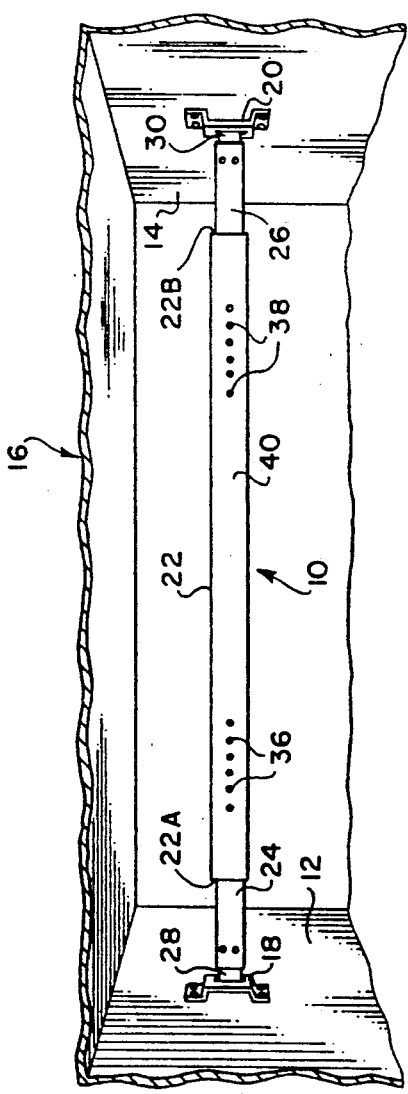
FIG. 1 is a partial perspective view of the interior of a load receptacle with a cargo beam according to the present invention anchored between opposing walls of the receptacle.

It will be appreciated that for purposes of clarity and where deemed appropriate, reference numerals have been repeated in the drawings to indicate corresponding features.

Referring to FIGS. 1-4, an elongated cargo beam 10 is adapted for spanning between opposed walls 12 and 14 of a load receptacle 16, such as the interior of a truck body. Opposed ends of beam 10 are anchored to the respective walls, 12, 14 by respective slotted mounting brackets, 18, 20 attached to the respective walls 12, 14.

Beam 10 includes a hollow elongated center section 22 and opposed end sections 24, 26 telescopically received within center section 22 and being extendable and retractable relative to respective opposed ends of center section 22. Beam 10 has a generally rectangular transverse cross-section and is preferably manufactured from an aluminum-based alloy material. Mounting plugs 28, 30 are partially inserted into respective end sections 24, 26 for engaging the respective slots in mounting brackets 18, 20 to anchor the respective ends of beam 10 with respect to walls 12, 14.

Figure 2:
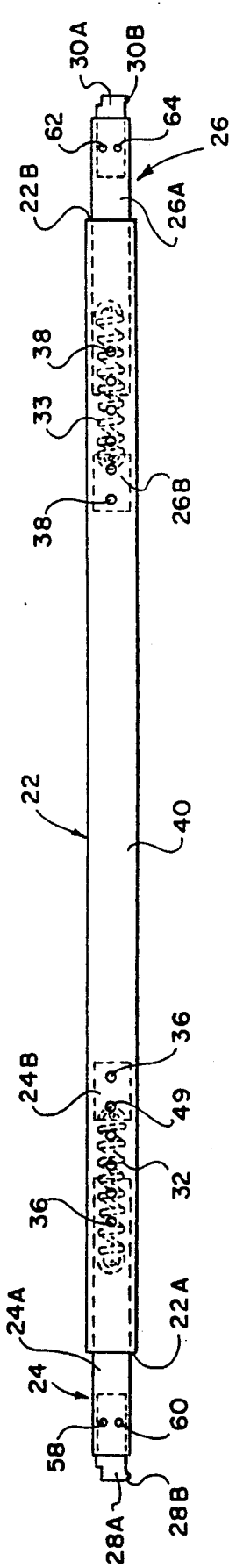
FIG. 2 is a side elevation view of the cargo beam of FIG. 1, with interior portions thereof illustrated in phantom.

Referring specifically to FIG. 2, end sections 24, 26 are of substantially identical construction. End section 24 is comprised of a pair of generally rectangular, tubular members 24A, 24B, with a compression spring 32 coupled therebetween. Similarly, end section 26 is comprised of first and second generally rectangular, tubular members 26A, 26B, with a compression spring 33 coupled therebetween. Mounting plugs 28, 30 are partially inserted into respective tubular members 24A, 26A. A portion of each plug 28, 30 extending from respective tubular members 24A, 26A is comprised of corresponding plates 28A, 30A, which are adapted for matingly engaging the corresponding slots in mounting brackets 18, 20. Tongues 28B, 30B project below the respective plates 28A, 30A, for retaining the corresponding plugs 28, 30 within the corresponding mounting brackets 18, 20, as will be described in greater detail hereinafter. The mounting plugs 28, 30 illustrated in FIGS. 1-6 are adapted for engaging standard "E type" mounting brackets or tracks, which have one or more elongated slots for receiving the corresponding mounting plug, as best seen in FIG. 1.

In the preferred embodiment, center section 22 is approximately 78 inches long and includes two sets of circular apertures 36, 38 in opposed side walls 40, 42 of center section 22. One set of apertures 36 commences approximately nine inches inwardly from one end 22A of center section 22, while the other set of apertures 38 commences approximately nine inches inwardly from opposite end 22B of center section 22. The individual apertures of each set 36, 38 are spaced apart at intervals of approximately two inches along the centerline of each of the side walls 40, 42 of center section 22, such that the innermost aperture of each set 36, 38 is located approximately 19 inches inward from the corresponding end 22A, 22B. Each aperture 36, 38 has a diameter of approximately 0.40 inch.

Corresponding apertures 36, 38 on the opposed side walls 40, 42 are aligned along respective transverse axes for receiving respective attachment members, as will be described hereinafter. Referring specifically to FIGS. 3 and 4, the length adjustment feature of cargo beam 10 will now be described with respect to end section 24. End section 26 is substantially identical to end section 24, so that one skilled in the art will recognize that the following description with respect to end section 24 is equally applicable to end section 26.

As best seen in FIG. 3, tubular member 24A includes aligned apertures in the opposed side walls thereof for receiving a roll pin 44 therethrough. The roll pin receiving apertures are located six inches from end 46 of tubular member 24A, along a longitudinal axis of tubular member 24A, on the approximate geometric centerline of each side wall of tubular member 24A. Roll pin 44 is used to anchor one end of compression spring 32. Tubular member 24B has a pair of aligned apertures in the opposed side walls thereof for receiving a second roll pin 48 therethrough. The roll pin receiving apertures in tubular member 24B are located on the approximate geometric centerline of each de wall thereof, approximately ¼ inch from end 50 of tubular member 24B. Roll pin 48 is adapted for anchoring an opposite end of compression spring 32, thereby coupling tubular members 24A, 24B together by means of spring 32. The roll pin receiving apertures in tubular members 24A, 24B are circular-shaped with a diameter of approximately ¼ inch. Roll pins 44 and 48 have a length of approximately 2¼ inches and are sized for snug fit engagement within the respective apertures.

The length of beam 10 is adjustable by varying the depth of penetration of either or both of the end sections 24, 26 into center section 22. Tubular member 24B includes a second pair of aligned apertures 49 (FIGS. 2,4) in the opposed side walls thereof, located along the approximate geometric centerline of each side wall, approximately one inch from end 50. Apertures 49 are adapted for receiving an attachment mechanism, which includes locking detents 52, 54 (FIG. 3), with compression spring 56 coupled therebetween. Detents 52, 54 are biased into mating engagement with apertures 49 by compression spring 56. Detents 52, 54 have respective enlarged shoulder portions 52A, 54A for retaining the respective detents 52, 54 within the corresponding apertures 49. Detents 52,54 are cylindrically-shaped, with a diameter of approximately ⅜ inch. Apertures 49 are circular-shaped, with a diameter of approximately 0.40 inch.

Tubular member 24B is secured to center section 22 by aligning apertures 49 with a corresponding pair of aligned apertures 36 in center section 22, such that detents 52, 54 are extended by spring bias through the corresponding apertures 36 to restrain the longitudal movement of tubular member 24B with respect to center section 22. The length of beam 10 can be adjusted, depending upon the particular pair of apertures 36 selected. In FIG. 3, detents 52, 54 are shown in mating engagement with the next to the innermost pair of apertures 36. If it is desired to lengthen beam 10, the operator need only compress detents 52, 54 to disengage them from apertures 36 and slide end section 24 outwardly until apertures 49 are aligned with the aligned pair of apertures 36 corresponding to the desired length of beam 10. Similarly, if it is desired to shorten beam 10, detents 52, 54 are disengaged from the corresponding apertures 36 and end sections 24 is retracted into center section 22 until apertures 49 are aligned with the aligned pair of apertures 36 corresponding to the desired length of beam 10. Depending upon which pair of apertures 36 is selected, each end of beam 10 can be adjusted a total distance of up to 10 inches.

Referring again to FIG. 2, tubular members 24A, 26A have respective pairs of holes on respective opposed side walls thereof, for being aligned with corresponding pairs of openings in the corresponding mounting plugs 28, 30, to receive respective pairs of roll pins 58, 60 and 62, 64. The attachment of mounting plug 28 to tubular member 24A is illustrated in FIG. 5. When plug 28 is partially inserted into tubular 24A, such that openings 66, 68 in plug 28 are aligned with respective holes 70, 72 in tubular members, roll pins 58, 60 are inserted through the respective aligned holes 70, 72 and openings 66, 68 to secure mounting plug 28 within tubular member 24A. Mounting plug 30 is attached to tubular member 26A in substantially the same manner. Holes 70, 72 have a diameter of approximately ¼ inch and are located approximately two inches from end 47 of tubular member 24A, approximately ⅜ inch from the respective top and bottom walls 74, 76 of tubular member 24A.

Figure 6:
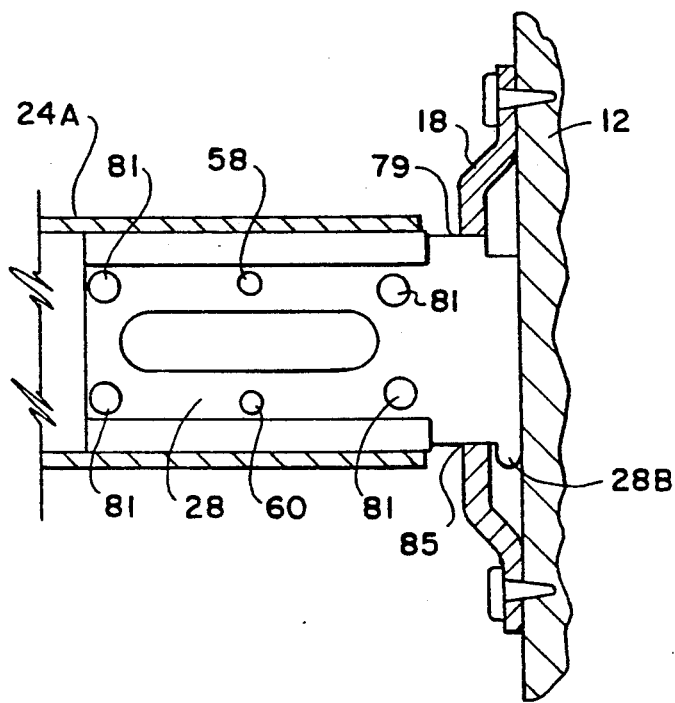
FIG. 6 is a side elevation view of one end of the cargo beam in mating engagement with an anchoring member on the wall of the load receptacle.

Referring to FIGS. 5 and 6, mounting plug 28 is configured to provide a self-locking feature when plug 28 is in mating engagement with a corresponding mounting bracket 18 attached to wall 12. A top part of plug 28 is notched adjacent a leading end 78 of plug 78, so that an uppermost portion 79 of plate 28A terminates short of leading end 78. Plate 28A is comprised of a plurality of plates in facing relationship and interconnected by attachment members 81. A leading surface 83 of uppermost portion 79 is in a trailing position with respect to leading end 78, to allow the front portion of plates 28A, which includes tongue 28B, to be inserted into the mounting bracket 18, in advance of uppermost portion 79. After tongue 28B has been inserted into bracket 18, end section 24 is lowered, so that tongue 28B is located below a bottom edge 85 of the slot to allow uppermost portion 79 to be received in the slot, as shown in FIG. 6. Tongue 28B will prevent the front portion of plates 28A from being disengaged from mounting bracket 18, thereby providing a self-locking feature. A separate locking mechanism is not required, as in prior art cargo beams. Compression spring 32 (FIG. 4) exerts a biasing force on tubular member 24A, with plug 28 carried therein, to help maintain plug 28 in mating engagement with mounting bracket 18.

In order to disengage mounting plug 28 from mounting bracket 18, tubular member 24A is moved outwardly against spring 32, so that uppermost portion 79 of plates 28A is retracted out of the slotted opening in mounting bracket 18. After uppermost portion 79 has cleared the slotted opening, end section 24 is lifted slightly to allow tongue 28B to clear the slot as the front portion of plates 28A, which includes tongue 28B, is retracted from bracket 18. Mounting plug 30, which is adapted for insertion into opposed tubular member 26A, has the same configuration as mounting plug 28 so that the cargo beam according to the present invention is equipped with a self-locking feature at both ends thereof.

Figure 7:
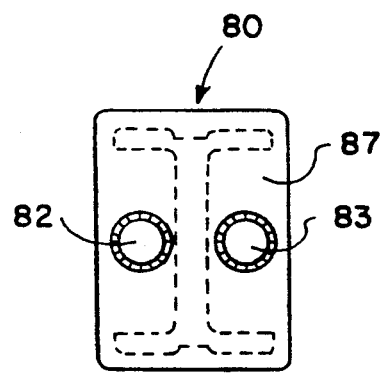
FIG. 7 is a front elevation view of an alternate embodiment of a mounting plug for anchoring the cargo beam on a wall of the load receptacle.

Referring to FIGS. 7 and 8, a mounting plug 80 is provided for engaging standard "F" tracks, commonly found in load receptacles, such as truck bodies. Plug 80 has a pair of rounded nipples 82, 83 on a front face 87 thereof. Nipples 82, 83 are adapted for mating with complementary circular openings in an "F" track 86, attached to a wall 88 of a load receptacle. Plug 80 has a pair of openings for being positioned in alignment with corresponding holes in tubular member 24A for receiving respective pins 90, 92 whereby plug 80 is secured to tubular member 24A. Another "F" track plug is inserted into and attached to tubular member 26A in substantially the same manner for mounting the beam on an opposite wall of the load receptacle.

The cargo beam according to the present invention is adapted for being used as a shoring beam for supporting vertically spaced loads within a load receptacle, such as a truck body, or the like, or as a divider for separating portions of the load within the truck body and preventing the loads from shifting laterally within the truck body. The length of the beam is adjustable at both ends thereof and has a self-locking feature, which facilitates adjustment and installation of the beam. The beam is adaptable for use in connection with a variety of standard mounting tracks, such as the aforementioned "E" and "F" tracks and can be used within truck bodies of varying widths. For example, in the preferred embodiment described above, when the beam is lying flat with each end section adjusted to its maximum retracted position within the center section, the total length of the beam will be approximately 90 inches. By compressing the spring within each end section of the beam, each end section is compressed approximately four inches, which allows the beam to be used within truck bodies having an eighty-four inch horizontal span. Each end section of the beam can be extended outwardly from the center section approximately 10 inches to accommodate a truck body having a horizontal span of up to 106 inches.

Various embodiments of the invention have now been described in detail. Since it is obvious that many changes in and additions to the above-described preferred embodiment may be made without departing from the nature, spirit and scope of the invention, the invention is not to be limited to said details except as set forth in the appended claims.

What is claimed is:

1. A cargo beam, comprising in combination:
an elongated center section;
opposed end sections telescopically received within said center section such that each of said end sections is extendable and retractable relative to said center section;
each of said end sections having a male mounting member extending therefrom for matingly engaging a complementary female anchoring member on a wall of a load receptacle, to mount the corresponding end section on the corresponding wall, each mounting member having a top portion and a bottom portion, said top portion being in fixed relationship with said bottom portion, each mounting member having a tongue projecting from the corresponding bottom portion, a leading end of each bottom portion extending outwardly from the corresponding end section a greater distance than a leading end of the corresponding top portion, to define a notch in opposed relationship with the corresponding tongue, the tongue and leading end of the corresponding bottom portion being insertable into the corresponding anchoring member in advance of said top portion, each top portion cooperating with the corresponding tongue to retain the corresponding mounting member in mating engagement with the corresponding anchoring member.

2. The cargo beam of claim 1 wherein each anchoring member has an opening through which the corresponding mounting member is insertable into the corresponding anchoring member, each mounting member being insertable into the corresponding anchoring member by inserting the corresponding tongue and leading end of the corresponding bottom portion into the corresponding anchoring member in advance of the corresponding top portion and then lowering the corresponding end section to allow the corresponding top portion to be inserted into the corresponding anchoring member, an uppermost surface of the mounting member being received within the opening of the corresponding anchoring member when the leading end of the corresponding top portion is inserted into the corresponding anchoring member, such that the depth of penetration of each mounting member into the corresponding anchoring member is limited by the depth of the anchoring member, each mounting member being disengageable from the corresponding anchoring member by moving the corresponding mounting member away from the corresponding wall such that the leading end of the corresponding top portion is disengageable from the corresponding anchoring member in advance of the corresponding tongue and leading end of the corresponding bottom portion and then lifting the corresponding end section to allow the corresponding tongue and leading end of the corresponding bottom portion to be disengaged from the corresponding anchoring member.

3. The cargo beam of claim 1 wherein each end section further includes biasing means coupled between the center section and the corresponding end section for urging the corresponding mounting member into mating engagement with the corresponding anchoring member, each mounting member being disengageable from mating engagement with the corresponding anchoring member by moving the corresponding end section against the corresponding biasing means to disengage the top portion of the corresponding mounting member from the corresponding anchoring member and then lifting the corresponding end section to allow the corresponding tongue and bottom portion to be disengaged from the corresponding anchoring member.

4. The cargo beam of claim 3 wherein each of said mounting members is a mounting plug carried in the corresponding end section, a portion of each plug protruding outwardly from the corresponding end section.

5. The cargo beam of claim 1 wherein each of said end sections includes first and second hollow members and a resilient member coupled between said first and second hollow members, each of said first hollow members being located within said center section and being adapted for attachment thereto, at least a portion of each of said second hollow members extending outwardly from said center section and having an open end for receiving a corresponding mounting member, each mounting member being mounted for co-movement with the corresponding second hollow member, each of said second hollow members being movable with respect to the corresponding first hollow member, each member resilient member biasing the corresponding second hollow member away from the corresponding first hollow member.

6. The cargo beam of claim 5 wherein each of said first hollow members is adapted for attachment to said center section at a plurality of discrete locations spaced along said center section such that said cargo beam is lengthwise adjustable by adjusting the location at which one or both of the first hollow members is coupled to said center section, said cargo beam being further lengthwise adjustable by adjusting the position of one or both of said second hollow members with respect to the corresponding first hollow members.

7. The cargo beam of claim 6 wherein said center section has a plurality of cooperating pairs of apertures in respective opposed side walls thereof at predetermined intervals along said center section, the apertures of each cooperating pair being aligned along respective transverse axes, the first hollow member of each end section having first and second holes in transverse axial alignment and means carried therein for attaching the corresponding first hollow member to the center section, said attachment means including first and second detents and a spring member coupled therebetween for biasing the first and second detents into mating engagement with the respective first and second holes, each of said first hollow members being detachably coupled to said center section by positioning the corresponding first and second holes in transverse axial alignment with a selected one of said cooperating pairs of apertures, so that the corresponding spring member biases the corresponding first and second detents into mating engagement with the respective first and second holes and the respective apertures aligned therewith, each of said first hollow members being detachable from said center section by compressing the corresponding first and second detents against the corresponding spring member to disengage the corresponding first and second detents from the corresponding apertures in said center section, to allow the corresponding first hollow member to be moved along said center section.

8. The cargo beam of claim 7 wherein each of said detents has an enlarged shoulder portion for engaging an inner wall of the corresponding first hollow member to limit the transverse axial movement of the corresponding detents.

9. A cargo beam, comprising, in combination:
an elongated center section;
opposed end sections telescopically received within said center section such that said end sections are extendable and retractable relative to said center section;
each of said end sections including first and second hollow members and a resilient member coupled therebetween for biasing said second hollow member away from said first hollow member, each of said first hollow members being located within said center section and being adapted for attachment thereto, a first portion of each of said second hollow members being located within said center section and a second portion of each of said second hollow members extending outwardly therefrom, each of said second hollow members being movable with respect to the corresponding first hollow member, said second portion of each of said hollow members having an open end for receiving a mounting member for engaging a complementary anchoring member on a wall of load receptacle, to mount the corresponding end section of the beam on the corresponding wall, each mounting member being mounted for co-movement with the corresponding second hollow member.

10. A cargo beam of claim 9 wherein each of said first hollow members is adapted for attachment to said center section at a plurality of discrete positions spaced along the center section, said cargo beam being lengthwise adjustable by adjusting the location at which one or both of said first hollow members is coupled to the center section, said cargo beam being further lengthwise adjustable by adjusting the position of one or both of said second hollow members with respect to the corresponding first hollow members.

11. The cargo beam of claim 10 wherein said center section has a plurality of cooperating pairs of apertures in respective opposed side walls thereof at predetermined intervals along said center section, the apertures of each cooperating pair being aligned along respective transverse axes, the first hollow member of each end section having first and second holes in transverse axial alignment and means carried therein for attaching the corresponding first hollow member to the center section, said attachment means including first and second detents and a spring member coupled therebetween for biasing the first and second detents into mating engagement with the respective first and second holes, each of said first hollow members being detachably coupled to said center section by positioning the corresponding first and second holes in transverse axial alignment with a selected one of said cooperating pairs of apertures, so that the corresponding spring member biases the corresponding first and second detents into mating engagement with the respective first and second holes and the respective apertures aligned therewith, each of said first hollow members being detachable from said center section by compressing the corresponding first and second detents against the corresponding spring member to disengage the corresponding first and second detents from the corresponding apertures in said center section, to allow the corresponding first hollow member to be moved along said center section.

12. The cargo beam of claim 11 wherein each of said detents has an enlarged shoulder portion for engaging an inner wall of the corresponding first hollow member to limit the transverse axial movement of the corresponding detents.

* * * * *